Dec. 24, 1935.  C. E. DILLINGER  2,025,043
EXHAUST STEAM CONDENSER, OIL SEPARATOR, AND FEED WATER HEATER AND PURIFIER
Filed Dec. 20, 1934  2 Sheets-Sheet 2

Witness
H. Woodard

Inventor
C. E. Dillinger
By H. R. Willson &co
Attorneys.

Patented Dec. 24, 1935

2,025,043

UNITED STATES PATENT OFFICE 2,025,043

EXHAUST STEAM CONDENSER, OIL SEPARATOR, AND FEED WATER HEATER AND PURIFIER

Charles E. Dillinger, Orcutt, Calif.

Application December 20, 1934, Serial No. 758,501

9 Claims. (Cl. 257—29)

The invention relates to apparatus for use in connection with boilers and steam engines, for condensing the exhaust steam from the engines and utilizing the heat of such steam for heating the boiler feed water, the water of condensation constituting part of the feed water while the remainder is supplied from any available source.

It is one object of the invention to provide an apparatus of the class described, in which all necessary equipment for condensing the exhaust steam, separating oil from the water of condensation, rectifying the "make-up" water, storing the feed water, and heating the same, is embodied in a single unit which may be easily installed.

Another object is to provide for automatically controlling the "make-up" water supply means in accordance with the level in the feed water storage tank and for automatically controlling the rectifier so that it acts each time water is being fed to said storage tank.

A further object is to make novel provision whereby the "make-up" water supplied to the rectifier is preheated by the exhaust steam to be condensed.

Still further objects are the provision of a novel and advantageous rectifier and an equally novel and advantageous oil separator.

With the foregoing and other objects in view which will become apparent as the description proceeds, the invention resides in the novel subject matter hereinafter described and claimed, description being accomplished by reference to the accompanying drawings.

Figure 1:
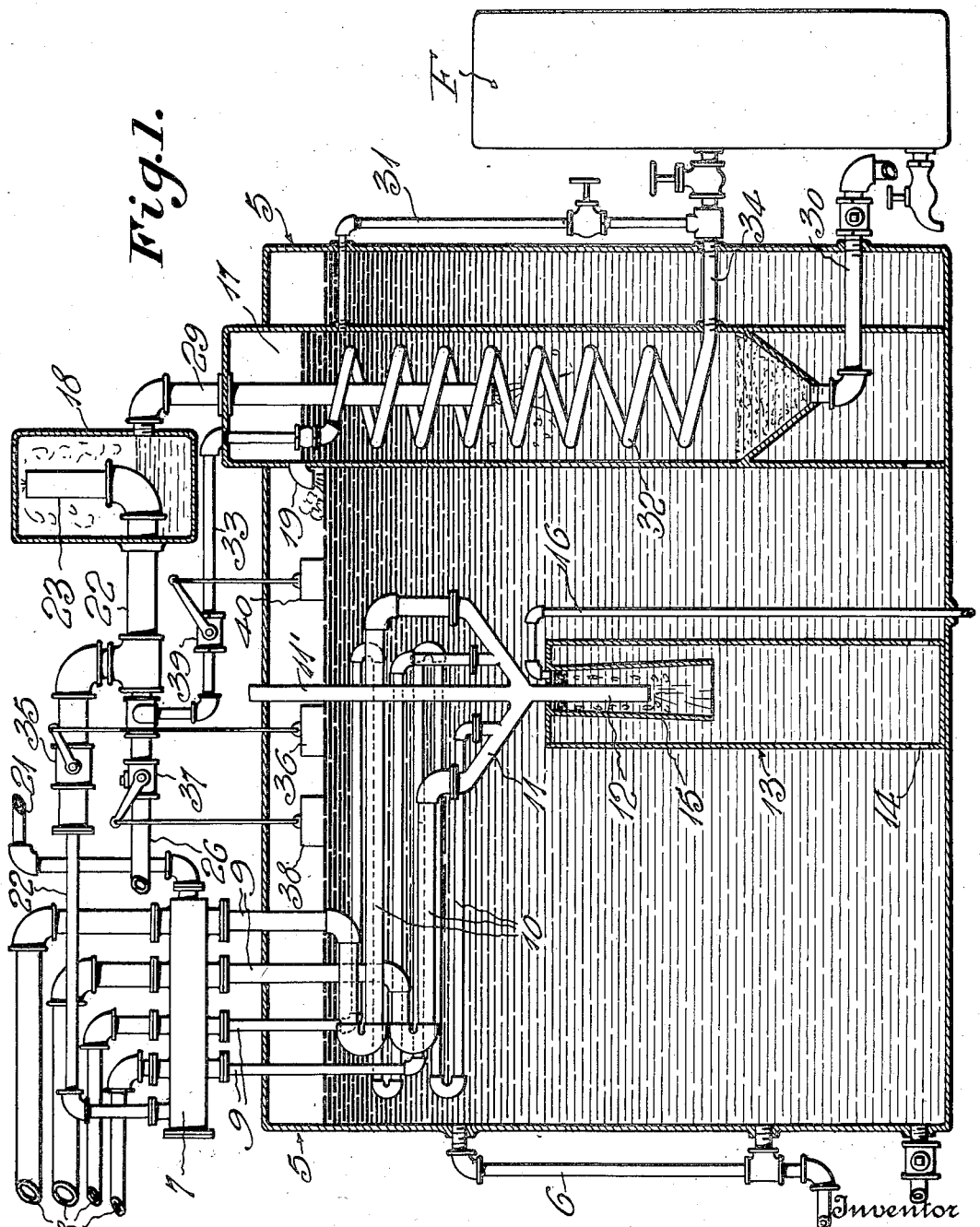
Fig. 1 is a vertical sectional view partly in elevation showing the complete apparatus.
Figure 2:
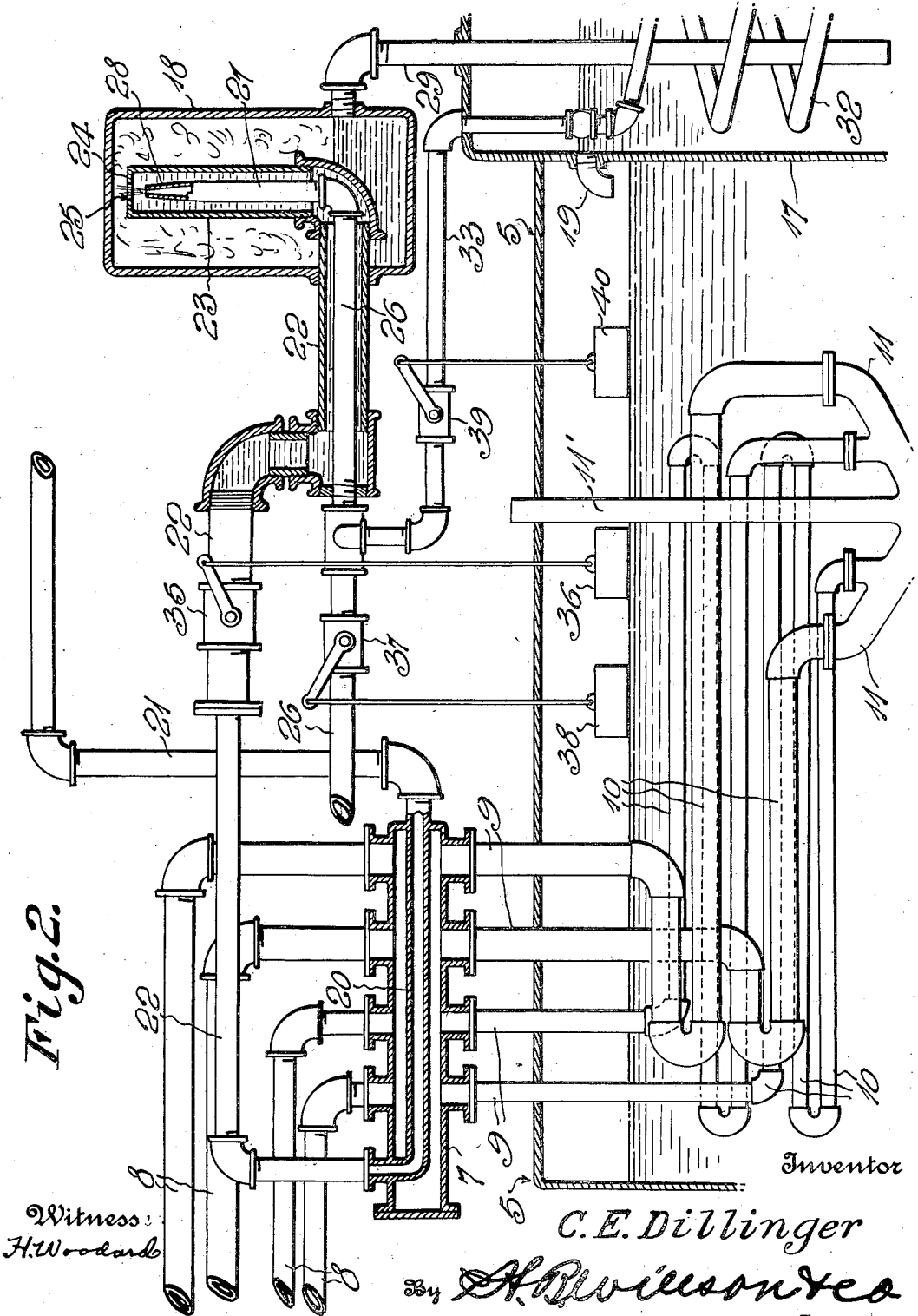
Fig. 2 is an enlarged sectional view partly in elevation through the upper portion of the apparatus.

A preferred construction has been shown and will be rather specifically described, with the understanding however, that within the scope of the invention as claimed, variations may be made.

A feed water storage tank 5 of desired capacity is provided, said tank having a feed water discharge line 6 leading to the usual pump or injector. Above the tank 5 is an exhaust steam receiving manifold 7 into which the exhaust steam is conducted from the various engines, through pipe lines 8. From the manifold 7, pipes 9 extend into the tank 5, said pipes being coupled to condensing coils 10 located in the water space of said tank. The delivery ends of these condensing coils are coupled to a manifold 11 from which a pipe 12 projects downwardly to conduct the water of condensation from the coils 10. The manifold 11 is also provided with a vent pipe 11' extending through the top of the tank 5. The pipe 12 passes through the top of an oil separating tank 13, the lower end of said tank being in communication with the tank 5 through suitable openings 14. A sleeve 15 surrounds the pipe 12 within the tank 13 and projects downwardly below said pipe, said sleeve and pipe being spaced apart to provide a space in which the oil discharging from the pipe 12 with the water of condensation may collect. An oil draw-off line 16 extends from the upper end of this space to the exterior of the tank 5.

The exhaust steam in passing through the manifold 7 and the coils 10, not only condenses to form part of the feed water which is stored in the tank 5, but the heat of said steam assists materially in heating the feed water preparatory to injection into the boiler. The oil separator separates any oil which may have entered the apparatus with the exhaust steam, from the water of condensation which passes on into the tank 5.

In the present showing, a sludge-collecting tank 17 is mounted principally in the tank 5 although it may project somewhat above said tank 5 as shown in the drawings. Above this sludge-collecting tank is a rectifying tank 18 for the "make-up" water. This rectifying tank 18 is included in the "make-up" water supply line which discharges into the sludge-collecting tank 17, this tank 17 being provided with an overflow 19 through which the rectified water discharges into the tank 5. The water supply line includes a portion 20 extending through the manifold 7, a portion 21 leading to one end of said portion 20 and a portion 22 which extends from the other end of said portion 20 into the rectifying tank 18, being provided within this tank with a vertical terminal 23. The upper end of this terminal is substantially closed at 24 but this closure is provided with a water conducting orifice 25. A live steam conducting line 26 extends through part of the pipe line portion 22 and is provided with an upstanding terminal 27 within the terminal 23 thereof, said terminal 27 having a steam discharge nozzle 28 slightly below and in axial alinement with the orifice 25. Whenever "make-up" water is discharged into the tank 18 through the orifice 25, steam is simultaneously discharged through the nozzle 28, with the result that the water is thoroughly atomized and effectively treated with the steam to separate salts, mud and other sediment from the water. The mixture then discharges through the pipe line portion 29 into the sludge-collecting tank 17. In this tank, the foreign matter settles to the bottom as shown in Fig. 1 and may be drawn off through suitable conducting means 30, while the purified water enters the tank 5 through the overflow 19. Some of the water from the upper portion of the tank 17 may be conducted through a pipe line 31 to a suitable filter F which prepares it for drinking or similar purposes.

I prefer to locate a steam coil 32 in the tank 17 to heat the water in the latter and thus assist in maintaining the feed water in the tank 5 at a proper temperature for admission to the boiler. A live steam line 33 leads to the upper end of the coil 32 and may well branch from the steam line 26. From the lower end of the coil 32, a pipe 34 may lead to the filter F.

A valve 35 is provided for the "make-up" water supply line, said valve being located in part of the line portion 22 in the present disclosure. This valve 35 is provided with an operating float 36 which rides the level of the feed water in the tank 5. The line 26 is also provided with a valve 37 operable by means of a float 38 which rides the feed water in the tank 5. The line 33 is likewise provided with a valve 39 having an actuating float 40 supported by the feed water. When the feed water in the tank 5 lowers, all of the valves 35, 37 and 39 open, thereby admitting more "make-up" water and bringing the rectifier into operation to treat this water with steam as above described, and at the same time admitting steam to the coil 32 to supply additional heat to the water in the sludge-collecting tank 17. When the water level has been restored in the tank 5, the valves 35, 37 and 39 are closed by their respective floats.

It will be seen from the above that novel and advantageous provision has been made for carrying out the objects of the invention, but attention is again invited to the possibility of making variations within the scope of said invention as claimed.

I claim:

1. An apparatus of the class described comprising a feed water storage tank, a steam condenser in said tank having an inlet for exhaust steam and an outlet for oil-laden water of condensation, an oil separator in said tank into which said condenser delivers said oil-laden water of condensation, said separator having a water outlet into said tank and an oil outlet to the exterior of said tank, and a make-up water rectifier having means for treating the make-up water with steam, said rectifier having inlets for the make-up water and the treating steam, and being provided with rectified water discharge means through which the rectified water enters said tank.

2. In an apparatus in which steam is condensed to heat feed water; a tank for the feed water, exhaust steam-condensing and water-heating means disposed at least partially in the water space of said tank, an oil separator in said tank connected with said steam-condensing and water-heating means to receive the oil-laden water of condensation therefrom, said separator having a water outlet into said tank and an oil outlet to the exterior of said tank, a water supply line having water heating and rectifying means, and a sludge-collector in said tank into which the rectified water is discharged, said sludge collector having a water outlet into said tank and a sludge outlet to the exterior of said tank.

3. In an apparatus in which steam is condensed to heat feed water; a tank for the feed water, exhaust steam-condensing and water-heating means disposed at least partially in the water space of said tank, the water of condensation from said steam-condensing and water-heating means being discharged into said tank to provide part of the feed water, and a water supply line leading to said tank, said water supply line having a portion extending through a part of said condensing and heating means to heat the water supplied to the tank through said line.

4. In an apparatus of the class described, a water tank, a water rectifier having means for discharging rectified water into said tank, a water supply line leading to said rectifier, a live steam line also leading to said rectifier for supplying steam to treat the water, a valve for said water supply line, a valve for said live steam line, and actuating floats connected with said valves and disposed in said tank.

5. In an apparatus of the class described, a water tank, a sludge-collecting tank at least partially within said tank and having a water outlet into said tank, a water-heating coil in said sludge-collecting tank, a water rectifier having an outlet into said sludge-collecting tank, a water supply line leading to said rectifier, a live steam line leading to said rectifier for supplying steam to heat the water, a second live steam line leading to said coil, and valves for said water and steam lines having actuating floats in the first named tank.

6. In an apparatus of the class described, a water rectifying tank having a water outlet, a water supply pipe having a terminal portion disposed in said tank, said terminal portion having a closure provided with a water discharge orifice, and a live steam line having a terminal portion within and concentric with said terminal portion of said water supply line, said terminal portion of said live steam line having a steam discharge nozzle spaced inwardly from said water discharge orifice.

7. In an apparatus of the class described, a purified water tank having an outlet line for supplying feed water to a boiler, a water-heater and exhaust steam-condenser within the water space of said tank, an oil separator into which the oil-laden water of condensation discharges from said heater and condenser, said separator being in the water space of said tank, said oil separator having a water outlet into the tank and an oil discharge line leading to the exterior of said tank.

8. In an apparatus of the class described, a purified water tank having an outlet line for supplying feed water to a boiler, a plurality of exhaust steam condensing and water heating coils in the water space of said tank, an exhaust steam admission manifold in communication with the inlet ends of said coils, another manifold in communication with the delivery ends of said coils to receive the oil-laden water of condensation therefrom, and an oil separator into which said other manifold discharges, said separator being in the water space of said tank, said separator having a water outlet into said tank and an oil discharge line to the exterior of said tank.

9. In an apparatus of the class described, a tank having a top and an inlet pipe for oil-laden water extending downwardly through said top, said tank being provided at its lower portion with a water outlet, a sleeve surrounding said inlet pipe and secured to said top, said sleeve projecting downwardly below said pipe and being spaced from the latter to provide an oil collecting space, and an oil outlet leading from said space.

CHARLES E. DILLINGER.